United States Patent
Hunter (10) Patent No.: US 9,097,070 B2
(45) Date of Patent: Aug. 4, 2015

(54) APPARATUS FOR AUTOMATED OILFIELD TORQUE WRENCH SET-UP TO MAKE-UP AND BREAK-OUT TUBULAR STRINGS

(75) Inventor: Douglas A. Hunter, Calgary (CA)

(73) Assignee: Canrig Drilling Technology Ltd., Houston, TX (US)

( * ) Notice: Subject to any disclaimer, the term of this patent is extended or adjusted under 35 U.S.C. 154(b) by 432 days.

(21) Appl. No.: 12/392,710

(22) Filed: Feb. 25, 2009

(65) Prior Publication Data
US 2009/0217788 A1    Sep. 3, 2009

Related U.S. Application Data

(63) Continuation of application No. PCT/CA2006/001406, filed on Aug. 25, 2006.

(51) Int. Cl.
E21B 19/16    (2006.01)

(52) U.S. Cl.
CPC ............... *E21B 19/16* (2013.01); *E21B 19/166* (2013.01)

(58) Field of Classification Search
USPC .......................................... 700/275; 81/57.33
See application file for complete search history.

(56) References Cited

U.S. PATENT DOCUMENTS

| | | | |
|---|---|---|---|
| 3,693,727 A | 9/1972 | Bell | |
| 3,745,820 A | 7/1973 | Weiner | |
| 3,768,573 A | 10/1973 | Jennings | |
| 3,799,009 A | 3/1974 | Guier | |
| 3,881,375 A | 5/1975 | Kelly | |
| 3,882,377 A | 5/1975 | Kelly | |
| 3,961,399 A | 6/1976 | Boyadjieff | |
| 4,023,449 A | 5/1977 | Boyadjieff | |
| 4,082,017 A | 4/1978 | Eckel | |
| 4,091,451 A | 5/1978 | Weiner et al. | |
| 4,125,040 A | 11/1978 | True | |

(Continued)

FOREIGN PATENT DOCUMENTS

| | | |
|---|---|---|
| CA | 1014705 | 8/1977 |
| CA | 1045112 | 12/1978 |

(Continued)

OTHER PUBLICATIONS

HiPer™ Control System, http://www.weatherford.com/weatherford/groups/public/documents/general/wft008924.pdf, 2005.

(Continued)

*Primary Examiner* — Ryan Jarrett
(74) *Attorney, Agent, or Firm* — Haynes and Boone, LLP (57) ABSTRACT

Automated make-up and break-up methods and apparatus for rotary oil well drilling are presented. The apparatus includes a drilling database storing tubular type records, a torque wrench having a spinner, and a controller. During make-up, the controller retrieves one or more tubular type records stored in the drilling database in order to configure the torque wrench and/or the spinner to connect an additional tubular section to a tubular string or to disconnect a connection between tubulars in accordance with tubular type parameters. Sensors are employed on various drill rig components and reported sensor values are monitored. Timers are started concurrent with the initiation of various make-up and break-out steps. Exceptions are thrown when sensor values are out-of-range or when steps take too long to complete. Advantages are derived from speeding-up drill rig operations.

18 Claims, 3 Drawing Sheets

(56) References Cited

U.S. PATENT DOCUMENTS

| | | | |
|---|---|---|---|
| 4,176,436 A | 12/1979 | McCombs et al. |
| 4,192,206 A | 3/1980 | Schulze-Beckinghausen |
| 4,202,225 A | 5/1980 | Sheldon et al. |
| 4,208,775 A | 6/1980 | McCombs et al. |
| 4,210,017 A | 7/1980 | Motsinger |
| 4,235,566 A | 11/1980 | Beeman et al. |
| 4,365,402 A | 12/1982 | McCombs et al. |
| 4,386,883 A | 6/1983 | Hogan et al. |
| 4,403,898 A | 9/1983 | Thompson |
| 4,437,363 A | 3/1984 | Haynes |
| 4,444,273 A | 4/1984 | Ruby |
| 4,444,421 A | 4/1984 | Ahlstone |
| 4,470,740 A | 9/1984 | Frias |
| 4,474,520 A | 10/1984 | Buckner et al. |
| 4,475,607 A | 10/1984 | Haney |
| 4,494,899 A | 1/1985 | Hoang et al. |
| 4,495,840 A | 1/1985 | Freitag et al. |
| 4,515,045 A | 5/1985 | Gnatchenko et al. |
| 4,548,544 A | 10/1985 | Van Appledorn |
| 4,552,041 A | 11/1985 | Coyle, Sr. |
| 4,567,779 A | 2/1986 | Byrne |
| 4,567,952 A | 2/1986 | Lemaire et al. |
| 4,574,664 A | 3/1986 | Curry |
| 4,592,125 A | 6/1986 | Skene |
| 4,603,464 A | 8/1986 | Smith, Jr. et al. |
| 4,688,453 A | 8/1987 | Schulze-Beckinghausen |
| 4,696,207 A | 9/1987 | Boyadjieff |
| 4,700,787 A | 10/1987 | Buck et al. |
| 4,709,766 A | 12/1987 | Boyadjieff |
| 4,725,179 A | 2/1988 | Woolslayer et al. |
| 4,727,781 A | 3/1988 | Yuehui et al. |
| 4,730,254 A | 3/1988 | Voden, Jr. |
| 4,738,145 A | 4/1988 | Vincent et al. |
| 4,739,681 A | 4/1988 | Pietras |
| 4,765,401 A | 8/1988 | Boyadjieff |
| 4,808,064 A | 2/1989 | Bartholet |
| 4,843,945 A | 7/1989 | Dinsdale |
| 4,924,954 A | 5/1990 | Mead |
| 4,941,362 A | 7/1990 | Tambini |
| 4,981,180 A | 1/1991 | Price |
| 5,036,927 A | 8/1991 | Willis |
| 5,050,691 A | 9/1991 | Moses |
| 5,056,864 A | 10/1991 | Cooper |
| 5,099,725 A | 3/1992 | Bouligny, Jr. et al. |
| 5,172,613 A | 12/1992 | Wesch, Jr. |
| 5,174,223 A | 12/1992 | Nagy et al. |
| 5,291,808 A | 3/1994 | Buck |
| 5,297,833 A | 3/1994 | Willis et al. |
| 5,402,688 A | 4/1995 | Okada et al. |
| 5,435,213 A | 7/1995 | Buck |
| 5,509,316 A | 4/1996 | Hall |
| 5,845,586 A | 12/1998 | Moore |
| 5,855,002 A | 12/1998 | Armstrong |
| 5,893,607 A | 4/1999 | Trimnell |
| 6,003,412 A | 12/1999 | Dlask et al. |
| 6,012,360 A | 1/2000 | Concha |
| RE36,631 E | 3/2000 | Tanabe et al. |
| 6,047,775 A | 4/2000 | Mock |
| 6,056,363 A | 5/2000 | Maddox |
| 6,070,500 A | 6/2000 | Dlask et al. |
| 6,079,925 A | 6/2000 | Morgan et al. |
| 6,082,224 A | 7/2000 | McDaniels et al. |
| 6,082,225 A | 7/2000 | Richardson |
| 6,102,476 A | 8/2000 | May et al. |
| 6,206,096 B1 | 3/2001 | Belik |
| 6,213,216 B1 | 4/2001 | Rogers |
| 6,237,445 B1 | 5/2001 | Wesch, Jr. |
| 6,263,763 B1 | 7/2001 | Feigel, Jr. et al. |
| 6,298,794 B1 | 10/2001 | Brown et al. |
| 6,311,789 B1 | 11/2001 | Saxman |
| 6,314,411 B1 | 11/2001 | Armstrong |
| 6,374,706 B1 | 4/2002 | Newman |
| 6,385,837 B1 | 5/2002 | Murakami et al. |
| 6,425,631 B1 | 7/2002 | Lin |
| 6,505,531 B2 | 1/2003 | Stogner |
| 6,532,648 B2 | 3/2003 | Murakami et al. |
| 6,533,519 B1 | 3/2003 | Tolmon et al. |
| 6,550,728 B1 | 4/2003 | Fuhrman |
| 6,634,259 B2 | 10/2003 | Castille |
| 6,715,569 B1 | 4/2004 | Rogers |
| 6,752,044 B2 | 6/2004 | Hawkins, III |
| 6,773,060 B2 | 8/2004 | Sher et al. |
| 6,810,820 B1 | 11/2004 | Okerlund et al. |
| 6,814,149 B2 | 11/2004 | Liess et al. |
| 6,896,055 B2 | 5/2005 | Koithan |
| 6,966,385 B2 | 11/2005 | Hemphill et al. |
| 6,971,283 B2 | 12/2005 | Belik |
| 7,000,502 B2 | 2/2006 | Belik |
| 7,028,585 B2 | 4/2006 | Pietras et al. |
| 7,036,396 B2 | 5/2006 | Moe et al. |
| 7,062,991 B1 | 6/2006 | West et al. |
| 7,100,698 B2 | 9/2006 | Kracik et al. |
| 7,117,938 B2 | 10/2006 | Hamilton et al. |
| 7,178,612 B2 | 2/2007 | Belik |
| 7,191,686 B1 | 3/2007 | Angelle et al. |
| 7,191,840 B2 | 3/2007 | Pietras et al. |
| 7,249,639 B2 | 7/2007 | Belik |
| 7,264,050 B2 | 9/2007 | Koithan et al. |
| 7,281,451 B2 | 10/2007 | Schulze Beckinghausen |
| 7,322,406 B2 | 1/2008 | Wiggins et al. |
| 7,435,924 B2 | 10/2008 | Schmitt-Walter et al. |
| 7,455,128 B2 | 11/2008 | Belik |
| 7,958,787 B2 | 6/2011 | Hunter |
| 8,042,432 B2 | 10/2011 | Hunter et al. |
| 8,074,537 B2 | 12/2011 | Hunter |
| 2002/0035876 A1* | 3/2002 | Donaldson, Jr. ............ 73/862.21 |
| 2002/0189804 A1 | 12/2002 | Liess et al. |
| 2004/0051326 A1 | 3/2004 | Belik |
| 2004/0144547 A1* | 7/2004 | Koithan et al. ............... 166/380 |
| 2004/0237726 A1 | 12/2004 | Schulze Beckinghausen |
| 2005/0047884 A1 | 3/2005 | Belik |
| 2005/0076744 A1 | 4/2005 | Pietras et al. |
| 2005/0077743 A1 | 4/2005 | Pietras et al. |
| 2005/0092143 A1 | 5/2005 | Lehnert et al. |
| 2005/0096846 A1* | 5/2005 | Koithan et al. .................. 702/6 |
| 2005/0188794 A1 | 9/2005 | Schulze-Beckinghausen |
| 2006/0011350 A1 | 1/2006 | Wiggins et al. |
| 2006/0011790 A1 | 1/2006 | Lenz |
| 2006/0017998 A1 | 1/2006 | Fujino |
| 2006/0118335 A1 | 6/2006 | Belik |
| 2006/0179980 A1 | 8/2006 | Pietras et al. |
| 2007/0068669 A1 | 3/2007 | Lesko |
| 2007/0074606 A1 | 4/2007 | Halse |
| 2007/0095257 A1 | 5/2007 | Hernandez |

FOREIGN PATENT DOCUMENTS

| | | |
|---|---|---|
| CA | 1062237 | 9/1979 |
| CA | 1107847 | 8/1981 |
| CA | 1132224 | 9/1982 |
| CA | 1164443 | 3/1984 |
| CA | 1167025 | 5/1984 |
| CA | 1185228 | 4/1985 |
| CA | 1194855 | 10/1985 |
| CA | 1195241 | 10/1985 |
| CA | 1250569 | 2/1989 |
| CA | 1254194 | 5/1989 |
| CA | 1255079 | 6/1989 |
| CA | 1257881 | 7/1989 |
| CA | 1265124 | 1/1990 |
| CA | 2018826 | 4/1991 |
| CA | 2048381 | 2/1993 |
| CA | 2113160 | 2/1993 |
| CA | 2113161 | 2/1993 |
| CA | 2131537 | 9/1993 |
| CA | 2139774 | 1/1994 |
| CA | 1327195 | 2/1994 |
| CA | 2148346 | 5/1994 |
| CA | 2115810 | 4/1995 |
| CA | 2195128 | 4/1995 |
| CA | 2224638 | 6/1999 |
| CA | 2325875 | 8/1999 |
| CA | 2260521 | 10/1999 |
| CA | 2363178 | 9/2000 |

(56) References Cited

FOREIGN PATENT DOCUMENTS

| | | |
|---|---|---|
| CA | 2306714 | 11/2000 |
| CA | 2389449 | 5/2001 |
| CA | 2390191 | 5/2001 |
| CA | 2397101 | 7/2001 |
| CA | 2404752 | 10/2001 |
| CA | 2195128 | 11/2001 |
| CA | 2407661 | 11/2001 |
| CA | 2476189 | 8/2003 |
| CA | 2381549 | 10/2003 |
| CA | 2487120 | 12/2003 |
| CA | 2451263 | 5/2004 |
| CA | 2484053 | 4/2005 |
| GB | 1470931 | 4/1977 |
| SU | 787624 | 12/1980 |
| SU | 1141180 A | 2/1985 |
| SU | 1361314 A1 | 12/1987 |
| SU | 1746297 A1 | 7/1992 |
| SU | 1834351 | 8/1996 |
| WO | WO 00/52297 | 9/2000 |
| WO | WO 01/51764 | 7/2001 |
| WO | WO 01/79652 | 10/2001 |
| WO | WO 03/069113 | 8/2003 |
| WO | WO 2008/022424 | 2/2008 |
| WO | WO 2008/022425 | 2/2008 |
| WO | WO 2008/022427 | 2/2008 |
| WO | WO 2008/028302 | 3/2008 |
| WO | WO 2008/034262 | 3/2008 |

OTHER PUBLICATIONS

JAMPro™ Net, http://www.weatherford.com/weatherford/groups/public/documents/general/wft008926.pdf, 2005.
Drillfloor Equipment, http://www.akersolutions.com/Internet/IndustriesAndServices/OilAndGas/Drilling+Equipment/DrillfloorEquipment.htm, 2008.
Robot Roughneck Ready to Rule, http://www.akersolutions.com/Internet/MediaCentre/Featurestories/OilandGas/RobotRoughneckreadytorule.htm, 2008.
Mechanized Rig Systems, http://www.weatherford.com/weatherford/groups/public/documents/general/wft000668.pdf.
U.S. Appl. No. 13/293,742, filed Nov. 10, 2011, Hunter.
www.akerkvaerner.com—Upgrade Kits for Drilling Equipment & Systems 2006 http://wenku.baidu.com/view/9c9ef42c2af90242a895e594.html.

* cited by examiner

APPARATUS FOR AUTOMATED OILFIELD TORQUE WRENCH SET-UP TO MAKE-UP AND BREAK-OUT TUBULAR STRINGS

CROSS-REFERENCE TO RELATED APPLICATION

This is a continuation application of co-pending Application No. PCT/CA2006/001406, filed Aug. 25, 2006, the contents of which is hereby incorporated herein in its entirety by express reference thereto.

FIELD OF THE INVENTION

The invention relates to oil and gas operations, and in particular to automating oil and gas tubular handling operations.

BACKGROUND OF THE INVENTION

In oilfield operations, tubular strings are made-up and broken-out using an arrangement of mechanized tongs known as a torque wrench. A pair of tongs is used to torque tubular connections for example to thread tubulars together in making-up a tubular string, and to unthread tubulars in breaking-out the string. Tubular strings include, for example, drill strings and liner strings, such as of casing.

The strata in which well bores are drilled are varied, which requires employing a variety of tubular types. A variety of tubular types must also be used according to well bore depth and drilling techniques. Tubulars include, for example: drill pipe, drill collars, casing, casing collars, well bore liners, cross-over subs, etc.

Tubular types have varied physical parameters including but not limited to: internal diameter, outside diameter, length, material hardness, thread length, thread pitch, thread hardness, thread taper angle, and are connected according to handling parameters such as set torque, spin speeds, torque wrench actuation speeds, etc.

Handling tubular strings during well bore drilling and completion is repetitive, and inherently dangerous. Errors and inefficiencies in making-up and breaking-out tubular strings can all lead to inefficient use of resources, downtime, and may jeopardize worker safety.

There is a need in oil and gas operations to mitigate the above-mentioned issues.

SUMMARY OF THE INVENTION

The invention encompasses a torque wrench configured to manipulate tubulars, the torque wrench including: a plurality of tubular type records retrievably stored in a memory store, each tubular type record being configured to store tubular type specific parameters; and a controller configured to: look-up at least one tubular type record corresponding to a pair of tubulars to retrieve tubular type specific parameters; configure the torque wrench to operate in accordance with the tubular type specific parameters retrieved; and cause the torque wrench to torque a connection between the pair of tubulars.

In accordance with another aspect of the present invention, there is provided a torque wrench configured to manipulate tubulars, the torque wrench including: a memory store including a plurality records, each record being configured to store a plurality of parameters; a sensor associated with the torque wrench, the sensor reporting a sensor value; a comparator configured to compare values; a controller configured to: look-up at least one record to retrieve at least one parameter; and cause the comparator to compare the reported sensor value against at least one of the retrieved parameters.

In accordance with yet another aspect of the present invention, there is provided a method of torquing a connection between a pair of tubulars of a tubular string using an oilfield torque wrench having a pair of tongs, the method including: retrieving, from a memory store associated with the torque wrench, tubular type specific parameters specified in at least one tubular type record, configuring the torque wrench to operate in accordance with the tubular type specific parameters retrieved, engaging the pair of tubulars in respective tongs of the torque wrench, and torquing the connection in accordance with the tubular type specific parameters retrieved. In one embodiment, the method further includes the making-up of the tubular string by selecting a tubular type of a tubular to be added to the tubular string. In one embodiment, the method further includes the prior steps of presenting a driller with a selection of tubular types and prompting the driller to select the tubular type of the additional tubular. In another embodiment, the method further includes: a) setting a timer to a time value corresponding to a process step, the time value being specified in the retrieved tubular type parameters; b) starting the timer substantially concurrently with the initiation of the process step; and c) determining whether the process step completes within a time period corresponding to the time value set. In a preferred embodiment, if the process step fails to complete within the time period, the method further includes: counting the failure to complete and reinitiating the process step and resetting the timer. In another embodiment, the reinitiating of the process step and timer further includes automatically reinitiating the process step, and resetting and restarting the timer. In a preferred embodiment, the method further includes monitoring at least one sensor associated with the torque wrench to obtain a sensor value. In yet a further preferred embodiment, the method further includes at least one of the following: logging the sensor value; displaying the sensor value on a driller's interface; comparing the sensor value against at least one of the tubular specific parameters; or a combination of the above. In another preferred embodiment, the method further includes at least one of: a) logging an indication that the reported sensor value is within a sensor value range; b) logging an indication that the reported sensor value is outside the sensor value range; c) displaying a sensor value out-of-sensor-value-range-indication on the driller's interface; d) alerting an off-site entity of the sensor value out-of-sensor-value-range indication; e) raising an alarm; f) repeating a process step once; g) repeating the process step for a predetermined number of times and increasing a counter each time; h) repeating the process step with the torque wrench configured to operate in accordance with a modified parameter; i) skipping the process step; j) restarting; k) prompting for human-intervention; and l) shutting-down.

It is to be understood that other aspects of the present invention will become readily apparent to those of ordinary skill in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE PREFERRED EMBODIMENTS

The detailed description set forth below in connection with the appended drawings is intended as a description of various preferred embodiments of the present invention and is not intended to represent the only embodiments contemplated by the inventor. The detailed description includes specific details for the purpose of providing a comprehensive understanding of the present invention. It will be apparent to those of ordinary skill in the art, however, that the present invention may be practiced without these specific details.

Figure 1:
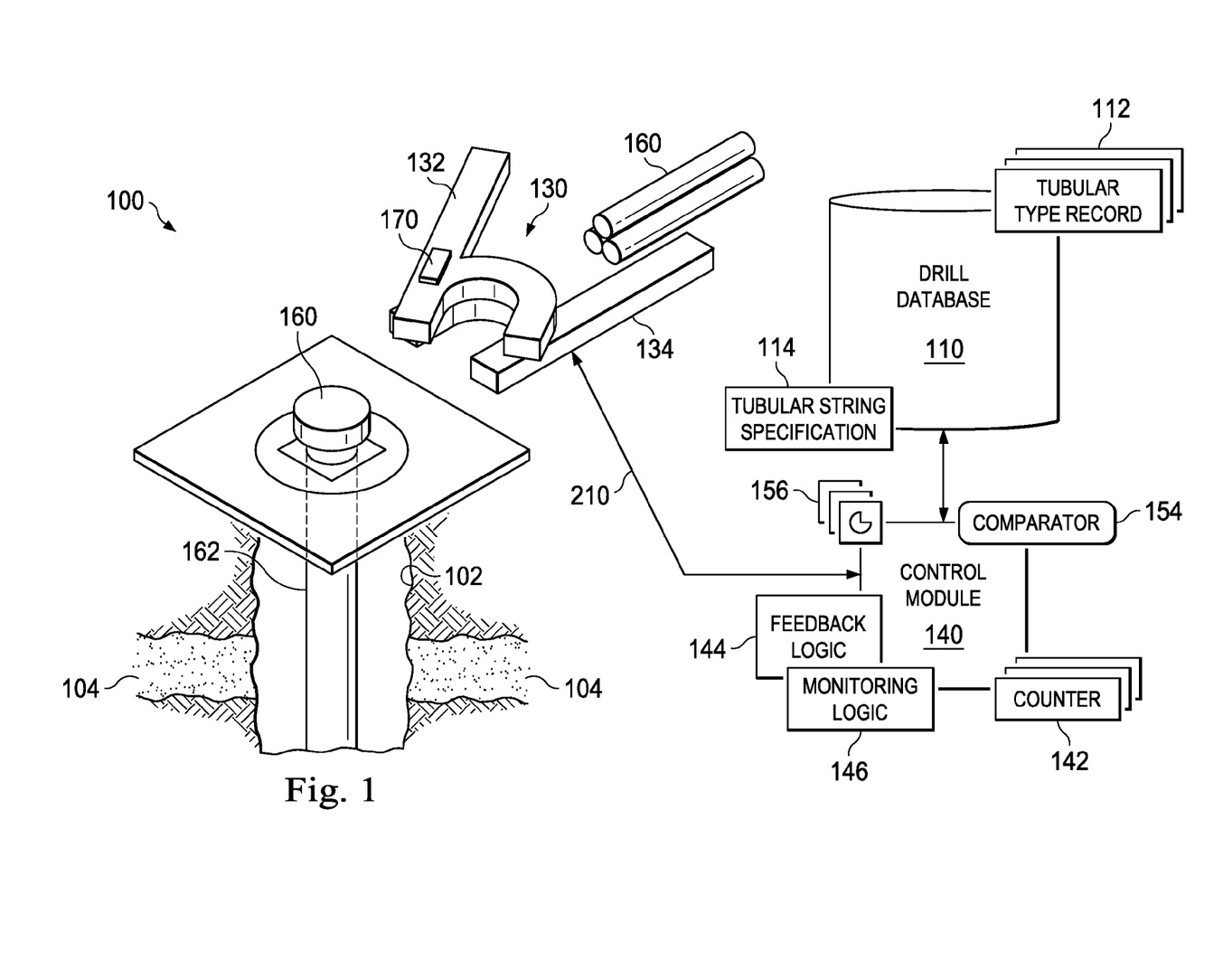
FIG. 1 is a schematic diagram showing, in accordance with one embodiment of the invention, elements implementing tubular handling automation.

In accordance with one embodiment of the invention, an oilfield apparatus 100 for tubular handling operations is shown in FIG. 1. The apparatus may include a torque wrench 130, a drilling database 110, and a control module 140. During tubular handling, the torque wrench 130 may be used to torque connections between tubulars 160, for example to make up the connections or break them out. The torque wrench 130 may be used to torque a connection including making-up a connection between tubulars (threadingly engaging tubulars together) or breaking-out a connection between tubulars. The torque wrench 130 may include an upper tong 132 used to engage a tubular 160 to be added to a tubular string 162 during make-up or the last tubular 160 in the tubular string 162 during break-out; a lower tong 134 used to engage the stump of the tubular string 162; and a spinner.
Pipe Profiling A multitude of different tubular types are employed to drill and complete well bores 102. Different tubulars 160 are required to drill though different strata 104 and to achieve desired tubular string characteristics.

The drilling database 110 may include a multitude of tubular type records 112. Each tubular type record 112 corresponds to a tubular type specification and for a particular tubular type may include a user-friendly name stored in a human readable string of characters describing the corresponding tubular type. For example: "4 in drill pipe", "6 in collar", "4½ in to 6 in sub," etc. As will be described herein below, the user-friendly tubular name may be displayed, for example on various screens of a human-machine "driller's" interface, allowing the driller to select or specify the use of the corresponding tubular type record by interacting with various items (selectors, touch screen areas, buttons, list elements, etc.) associated with the displayed user-friendly name. Any human-machine interface may be used, such as for example a computerized, analog, stationary, mobile, remote, drill site-located, etc. driller's interface.

Each tubular type record 112 may further store tubular type specific parameters such as, but not limited to: inner diameter, outer diameter, tubular length from sealing face to sealing face, maximum torque specification, a percentage of full torque cylinder make-up speed, a percentage of frill torque cylinder break-out speed, connection spin-in time, connection spin-out time, etc.

The maximum torque specification specifies the maximum amount of torque to be used with the corresponding tubular. The connection spin-in time value specifies the amount of time that the spinner will run to take the tubular 160 from being uncoupled to the point when make-up torque is to be used. The connection spin-out time value specifies the amount of time that the spinner is driven to take the tubular 160 from the break-out torque point to the tubular 160 being uncoupled. The percentage of frill torque cylinder make-up speed value specifies the torque cylinder make-up speed fraction of full speed is to be used during make-up. The percentage of full torque cylinder break-out speed value specifies the torque cylinder break-out speed fraction of frill speed is to be used during break-out. The percentage of torque cylinder speed value may be employed to set a hydraulic valve to a percentage of being fully open, to control the speed with which the piston of a hydraulic cylinder moves in swiveling the tongs of the torque wrench 130 relative to each other. Faster speeds may be employed for smaller diameter tubulars 160 or when accuracy is of a lesser importance. Slower speeds may be employed for larger diameter tubulars 160 or when greater accuracy is desired.

In accordance with one implementation of the first embodiment of the invention, the database 110 may include a plurality of different tubular type records 112, each record relating to a tubular type and its specification. Employing the drilling database 110, spares the driller from repeatedly entering tubular type specific parameters to operate the torque wrench 130 at a substantial reduction of operational overheads. The tubular type specific parameters for the plurality of tubulars used for a drilling operation are entered using a tubular type specific parameter entry screen or interface presented to an operator, such as but not limited to via the driller's interface. The operator selects each tubular type record 112 in the database, one at the time, and enters a parameter value for each parameter value field in the record using a keyboard. In order to prevent unwanted tampering with the drilling database 110 and perhaps with the drilling operation, the drilling database 110 may be password protected.

The driller is subsequently enabled to select a tubular type record 112 from the group of tubular type records in the database for example as shown on a tubular type record selection screen of the driller's interface, as needed, during an operation.

In one embodiment, the driller may select a tubular type record 112 and modify the tubular type record 112 before it is used to operate the torque wrench in order to change a tubular type specific parameter, such as, but not limited to, the maximum torque specification parameter.

After a particular tubular type record 112 is selected by the driller, the tubular type specific parameters are employed to configure and operate the torque wrench for example by setting up and/or controlling operation of control valves, motors and drive systems, timers, counters, notifications, etc. of the torque wrench 130. The controller 140 may retrieve or obtain the tubular type specific parameter values for the currently selected or active tubular type record 112, and writes the values in corresponding registers at corresponding working memory locations where torque wrench logic expects the parameters to be specified. The torque wrench logic employs the values to set pressure valves, timers, counters, etc.

The tubular type record 112 to be used for torquing any connection may be expressly selected by the driller, or be selected by default.

In drilling a well bore, the bit wears out and requires bit replacement or core samples need to be taken of the formation being drilled through, as a result, the tubular string 162 may be made-up and broken-out a number of times before the well bore is drilled to the desired depth.

In accordance with the embodiment of the invention, the control module 140 is employed to automate aspects of tubular string make-up and break-out. Without limiting the invention, the control module 140 may include one or more of: hardware, hardware logic, firmware, microprocessor(s), memory storage, software, ancillary electronics, instrumentation, etc.

Figure 2:
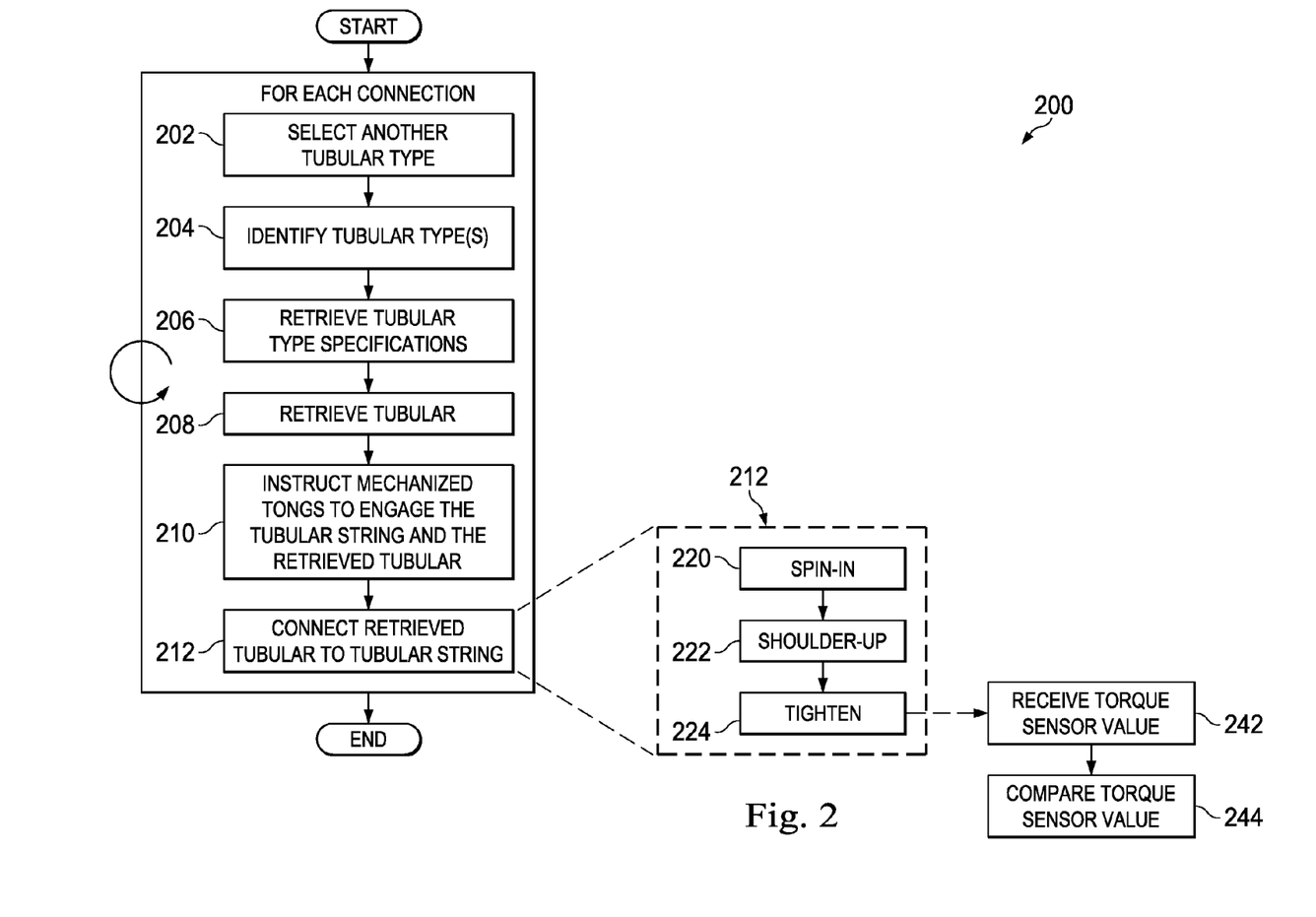
FIG. 2 is a flow diagram showing process steps implementing tubular handling automation.

Without limiting the invention, during make-up, the control module 140 may be configured to: look-up (202) the tubular string specification 114 in the drilling database 110; present to the operator a default tubular type of the next tubular to be added to the tubular string; provide the operator with the opportunity to change the tubular type if necessary; look-up (206) the tubular type record 112 in the drilling database 110 to retrieve tubular type specific parameters; prompt (208) for the retrieval of an additional tubular 160; pre-configure 110 the torque wrench 130 to operate in accordance with tubular type specific parameters retrieved; subsequent to the retrieval (208) of, and stabbing into the stump, the additional tubular 160, instruct (210) the torque wrench 130 to engage the stump of the tubular string 162 and the retrieved tubular 160; and to appropriately instruct (210) the torque wrench 130 to connect the retrieved tubular 160 to the tubular string 162 in accordance with the retrieved tubular type specific parameters. The retrieved tubular 160 is connected to the existing tubular string 162 (stump) by threadingly engaging a pin end of the retrieved tubular 160 to a box end of the last tubular 160 of the tubular string 162.

In accordance with the first embodiment of the invention, a make-up process 200 directed by the control module 140 is shown in FIG. 2. Without limiting the invention, the method of making-up a tubular string 162 for well bore drilling may include a multitude of steps.

As tubulars 160 are to be connected to each other, for each connection, the last tubular 160 connected to the tubular string 162 may be used as the default tubular 160 for further connections. Once the tubular type is selected, the tubular type will be used until the driller selects a new tubular type. The driller may be given an opportunity 202 to select a different tubular type.

Considering 204 that the tubulars 160 of each pair may be of the same type or of different types, for each connection therefore, at least one tubular type record 112 may be looked-up 206 by the controller 140 in the drilling database 110 to obtain tubular type specific parameters. If the last tubular 160 in the tubular string 162 and the tubular 160 to be added are of the same type, then only one tubular type record 112 may be looked-up 206. If the tubular 160 to be added is different then the last tubular 160 of the tubular string 162, then both corresponding tubular type records 112 may be looked-up 206.

During a method to make up a connection in a tubular string, a physical tubular 160 to be added to the tubular string 162 is retrieved 208 and stabbed into the stump. The controller 140 may prompt the driller to confirm that a tubular 160 has been stabbed into the stump. Alternatively, the stabbing of a tubular 160 into the stump may be sensed. The controller 140 instructs 210 the torque wrench 130, to engage the tubular string 162 stump and the retrieved tubular 160 to be connected thereto. The retrieved tubular 160 is connected 212 to the tubular string 162 in accordance with retrieved tubular type specific parameters specified in the at least one tubular type record.

Without limiting the invention, connecting 212 the retrieved tubular 160 to the tubular string 162 may be divided into three steps: spin-in 220, shoulder-up 222, and tighten 224. The spin-in step 220 is performed by the spinner by rapidly spinning the tapered pin end of the retrieved tubular 160 into the box end of the tubular string stump 162, which is the box end of the last tubular 160 in the tubular string 162. The spinner may be preset to spin the tubular in for the duration of the spin-in time specification obtained from the tubular type record 112. Shouldering-up 222 is achieved when the entire length of the pin end thread of the retrieved tubular 160 has been threaded in. If shouldering-up is not achieved after the expiration of the spin-in time, the spinner may be spun again perhaps for a shorter spin-in time. In operating the torque wrench tongs to make-up the connection, tightening 224 requires applying the torque specified in the at least one tubular type record 112 at the percentage of torque cylinder make-up speed also specified in the tubular type record 112. For example, when dissimilar tubulars 160 are connected, the torque used may be the lower of the two.

The torque wrench 130 may operate without human intervention to complete tasks. In so doing, the controller 140 may look-up tubular type specific parameters, set up the torque wrench 130 to accommodate the next tubular 160 based on the parameters, and operate the torque wrench to make-up the connection according to those parameters.

The control module 140 may include feedback logic 144, monitoring logic 146, and may interface with monitoring components.

Considering that oil well drilling operations are costly, if a tubular string 162 is damaged, substantial costs and downtime can be incurred. Monitoring the operational parameters of the torque wrench 130 provides a measure of safety against mishaps.

Without limiting the invention, the monitoring components may include sensors 170 affixed to various drill rig components such as, but not limited to: a switch, a timer, a counter, a temperature probe, a strain gage, a load cell, a tension cell, a pressure load cell, a transducer, a deflection transducer, a linear transducer, a pressure transducer, etc. Sensors 170 report, for example, sensor values, component function, or geometry, and switch positions via feedback logic 144 to the monitoring logic 146 of the control module 140. For example, reported sensor values, may include: oil temperature, hydraulic fluid pressure, a degree of piston extension, etc.

For example, a torque sensor 170 may be affixed to the torque wrench 130 to report 242 torque sensor values as tubulars 160 are connected to the drill string 162. A drilling operator can be provided with a log of torque values. The drilling contractor can audit the operation of the torque wrench 130 based on the log.

For example, without limiting the invention, the torque sensor 170 may include at least one pressure transducer measuring the hydraulic pressure used by a hydraulic piston used to displace the upper tong 132 against the lower tong 134.

During subsequent tubular string break-out, the control module 140 may look-up at least one tubular type record 112 to obtain operational parameters with which to configure the torque wrench 130, such as, but not limited to, the torque to apply with the torque wrench 130 in breaking-out a connection. At least initially, the torque wrench 130 may employ the percentage of the typical torque cylinder break-out speed value stored in the tubular type record 112 of the tubular 160 to be disconnected as the maximum speed to be applied, as during normal use of the tubular string to drill the well bore the connections relax due to vibration. If the initial torque cylinder break-out speed applied is not enough to break-out the connection, it may be surmised that the connection was not torqued property as stress forces imparted to the tubular string 162 during the drilling operation have applied additional torque to the connection. If breakout is not achieved, the torque wrench 130 is reconfigured to attempt break-out again at a higher torque/torque cylinder break-out speed percentage.

In accordance with the another embodiment of the invention, the control module 140 is adapted to issue start/stop instructions to various controlled components including, but not limited to: the spinner, the drive system between the lower tong 134 and the upper tong 132, a drive system for tubular gripping dies, etc.

The control module 140 may issue instructions subject and/or responsive to a time delay since a previous start instruction and/or subject to feedback.

Onboard Diagnostics and Fault Response

The monitoring logic 142 is not limited to monitoring torque measurements, a myriad of feedback components may be employed to quantify a variety of measurables and to detect a variety of events. The monitoring and logging of feedback information allows for diagnostics to be performed.

In accordance with an exemplary implementation of the exemplary embodiment of the invention, the monitoring logic 146 monitors a multitude of measurables and/or events, combinations of parameters such as, but not limited to: time duration, switch position, reported sensor value, etc. Controller 140 may employ a comparator 154 to compare reported sensor values to: a desired sensor value, a sensor value threshold, an acceptable sensor value range, a counter, a time value, etc. Should a reported sensor value be out-of-range, an exception can be thrown. A comparison indicator associated with the driller's interface may report the exception to the driller.

Figure 3:
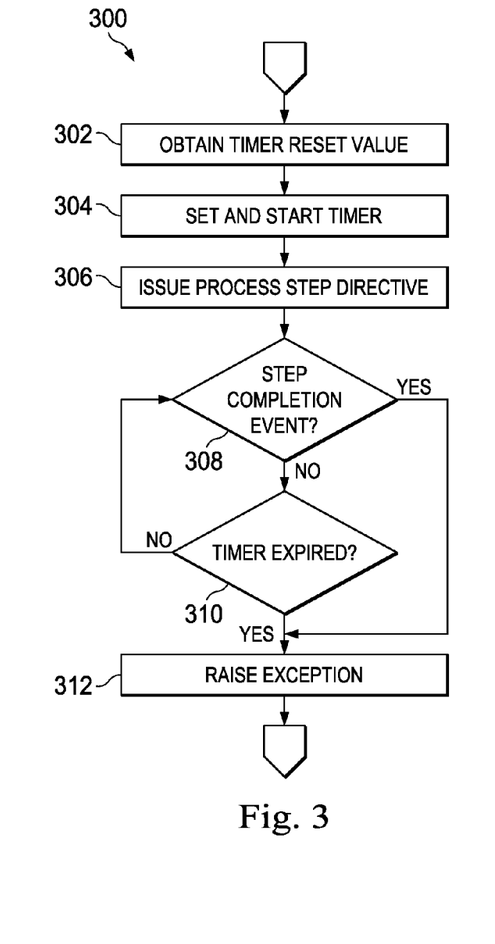
FIG. 3 is a flow diagram showing process steps implementing process step monitoring.

In accordance with an exemplary implementation of the exemplary embodiment of the invention, the controller 140 employs a meta process 300 shown in FIG. 3 wherein various steps to be performed in the process 200 may have an associated time interval during which the process step is expected to complete. Without limiting the invention, timer values may be specified in, and obtained 302 from the tubular type records 112. A corresponding timer 156 may be set and started 304 at substantially the same time the process step is initiated 306 by the controller 140.

Each process step may have a process step completion confirmatory event, which may be detected by a sensor; the desired result being that each process step would be completed 308 before the corresponding timer 156 reaches an expected end time 310.

The step completion confirmatory event may as simple as a reported sensor value reaching a sensor value threshold specified in a tubular type record 112. For example, a linear transducer may be employed to confiner that a tong being moved to engage a tubular 160 has reached a start position.

The step completion confirmatory event may be complex, such as for example, wherein a combination of multiple reported sensor values are compared against corresponding sensor value ranges specified in at least one tubular type record 112, the substantial statistical correlation of which being considered to confirm the completion of the process step. Accordingly, previous human-monitored step completion confirmatory events such as, but not limited to: shouldering-up a tubular 160, breaking-out a connection, etc. are mapped to complex step completion confirmatory events wherein the results of comparisons of output values of multiple sensors for example measuring torque, hydraulic pressure, elapsed time, etc. are combined.

If a step fails to complete, the step may be repeated automatically or other actions may be taken without human intervention as detailed herein below. If the step fails to complete repeatedly, the number of times the step has failed to complete may be monitored via corresponding counters 142.

In accordance with an embodiment of the invention, the elapse 310 of the timer 156 before the step completion confirmatory event comes about 308, may trigger an exception 312. Typical exceptions may be:
  merely reported for statistical purposes;
  reported for trending analysis;
  raising alerts;
  raising alarms; and
  wired/configured to shutdown the torque wrench 130 and/or the drilling rig.

The exceptions may be reported to the driller's interface, or may be reported off site via a transceiver.

An increase in reliability may be achieved because automated monitoring allows for error detection before damage occurs, statistical analysis of trends in operation, and reduces the possibility for erroneous human interpretation of data.

In accordance with the embodiment of the invention, once an exception is thrown, the controller 140 may, without human intervention, depending on the process step which resulted in the thrown exception, intervene to address the exception. This can include one or more of the following:
  repeat the step once;
  repeat the step for a predetermined number of times and incrementing a counter each time;
  repeat the step with different torque wrench parameter settings, such as for example higher torque;—skip the step;
  restart;
  shutdown a drilling ring subsystem; and
  prompt for human intervention.

The use of sensors, timers 156, switches, and comparator 154 allows use of measured, and reported, events and sensor values, devoid of human opinion/interpretation/oversight, to audit the operation of the torque wrench 130, and address and direct resolution of a deviation from expected torque wrench operation.

For certainty, the monitoring performed by the controller 140 described herein also applies to general torque wrench 130 operations distinct from torquing connections, torque wrench operational parameters being stored in records in a working store separate from the tubular type records. The torque wrench working store may include the drilling database 110.

Remote Monitoring and Troubleshooting

The reduction in the number of personnel operating the drilling rig provided leads to a reduction in the number of skilled individuals that can assess the status of the drilling operation from the benign alert to the undesirable destruction of the drilling rig.

In accordance with an implementation of the embodiment of the invention, the drill master may be provided with a wireless interface, typically embodying a portable wireless device incorporating controls otherwise integrated into the drill master's interface in the cabin. The portable wireless device may be worn around the drill master's neck, over the shoulder, around the waist, etc.

Drilling investments being large, mitigating the reduction in personnel includes a monitoring and troubleshooting interface whereby off-site personnel is provided with a remote monitoring and troubleshooting interface. Off-site personnel (service department) can login remotely and may, without limiting the invention, either:
  observe tracked operational parameters of the entire drilling operation in real time as sensor values are being reported;

view the values of the operational parameters at the time the rig/torque wrench 130 were shutdown;
audit operational historical parameter value trends;
audit operational parameter value trends leading to an event;
perform statistical analysis on parameter values and parameter value trends; and
diagnose drilling operations.

In accordance with an implementation of the embodiment of the invention, as drill rigs are typically operated in geographically remote locations, a telecommunications infrastructure is employed. Without limiting the invention thereto, the telecommunications infrastructure may include: satellite communications, wireless communications, and wired communications. In one embodiment, the infrastructure may include the Internet.

Although various aspects of the present invention have been described herein including for example a drilling database, a tubular type record, tubular type specific parameters, a driller's interface, a controller, a sensor, a comparator, a comparison indicator, a interface, wireless interface, a virtual interface, and a transceiver, it is to be understood that each of these features may be used independently or in various combinations, as desired, in a torque wrench.

The previous description of the disclosed embodiments is provided to enable any person of ordinary skill in the art to make or use the present invention. Various modifications to those embodiments will be readily apparent to those of ordinary skill in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more." All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC §112, sixth paragraph, unless the element is expressly recited using the phrase "means for" or "step for."

What is claimed is:

1. A torque wrench apparatus configured to manipulate tubulars, the torque wrench apparatus comprising:
    a memory store including a plurality of records, each record storing a plurality of tubular type specific parameters comprising at least one of a spin-in time value and a spin-out time value, the spin-in time value specifying an amount of time to couple tubulars, the spin-out time value specifying an amount of time to uncouple tubulars;
    at least one sensor configured to monitor at least one process step of a tubular make-up process step or a tubular break-out process step, the at least one sensor reporting a sensor value that indicates completion of the process step;
    a timer configured to measure elapsed time from the beginning of the at least one process step until an occurrence of at least one step completion confirmatory event, the timer reporting a timer value; and
    a counter configured to be incremented each time the at least one process step fails to complete within the spin-in time value or the spin-out time value, the counter reporting a counter value;
    a comparator configured to compare values, the comparator reporting a comparator value; and
    a controller configured to:
        look-up at least one of the plurality of records to retrieve at least one of the spin-in time value and the spin-out time value;
        cause the comparator to compare: the reported timer value, to the spin-in time value or the spin-out time value to detect whether the at least one process step fails to complete within the spin-in time value or the spin-out time value; and
        receive the counter value from the counter when the at least one process step fails to complete within the spin-in time value or the spin-out time value.

2. The torque wrench apparatus of claim 1, wherein the plurality of records further comprises a plurality of tubular type records storing tubular type specific parameters; the controller further being configured to:
    a) look-up at least one tubular type record corresponding to a pair of tubulars to retrieve tubular type specific parameters;
    b) configure the torque wrench apparatus to operate in accordance with the tubular type specific parameters retrieved; and
    c) cause the torque wrench apparatus to torque a connection between the pair of tubulars.

3. The torque wrench apparatus of claim 2, the tubular type specific parameters comprising at least one of: maximum torque specification, a torque cylinder make-up speed, and a torque cylinder break-out speed; or at least one of: internal diameter, outside diameter, length, material hardness, thread length, thread pitch, thread hardness, and thread taper angle.

4. The torque wrench apparatus of claim 1, further comprising a driller's interface configured to display the reported sensor value, the reported timer value, the reported counter value, the reported comparator value, or the result of the comparison performed by the comparator.

5. The torque wrench apparatus of claim 4, further comprising an interface configured to provide remote access to the driller's interface for remotely monitoring the reported sensor value, the reported timer value, the reported counter value, the reported comparator value, or the result of the comparison performed by the comparator in real time.

6. The torque wrench apparatus of claim 1, the tubular type parameters further comprising one of a specification, a range, and a threshold.

7. The torque wrench apparatus of claim 6, the comparator being further configured to compare the reported sensor value, the reported timer value, or the reported counter value against a sensor value range, a timer value range, or a counter value range, respectively.

8. The torque wrench apparatus of claim 7, further comprising a driller's interface configured to display an indication specifying whether the reported sensor value, the reported timer value, or the reported counter value is within the sensor value range, the timer value range, or the counter value range, respectively.

9. The torque wrench apparatus of claim 1, wherein the sensor further comprises one of: a switch, a counter, a timer, a temperature probe, a strain gage, a load cell, a tension cell, a pressure load cell, a transducer, a deflection transducer, a linear transducer, and a pressure transducer.

10. The torque wrench apparatus of claim 1, the controller being further configured to raise an exception triggered by the comparison performed by the comparator.

11. The torque wrench apparatus of claim 10, the controller being further configured to address the exception by performing at least one of the following:
   repeat the at least one process step once; repeat the at least one process step for a predetermined number of times while incrementing the counter each time; repeat the at least one process step for a predetermined amount of time measured by the timer; and
   skip the at least one process step, restart, shutdown a subsystem, and prompt for human intervention.

12. The torque wrench apparatus of claim 10, further comprising a transceiver configured to alert an off-site entity when the exception is raised.

13. The torque wrench apparatus of claim 1, further comprising a virtual interface configured to provide remote access to the memory store for monitoring drilling operations.

14. The torque wrench apparatus of claim 1, wherein the memory store further comprises a log configured to store the sensor value, the timer value, the counter value, or the comparison result, the controller further being configured to store in the log the sensor value, the timer value, the counter value, or the result of the comparison.

15. The torque wrench apparatus of claim 1, the controller being further configured to detect the occurrence of the at least one step completion confirmatory event based on at least one of: the reported sensor value, the reported timer value, the reported counter value, the reported comparator value, the result of the comparison, and at least one of the tubular type specific parameters.

16. The torque wrench apparatus of claim 15, the controller being further configured to raise an exception triggered by the detection of the occurrence of the at least one step completion confirmatory event.

17. The torque wrench apparatus of claim 16, the controller being further configured to address the exception by performing at least one of the following:
   repeat the at least one process step once; repeat the at least one process step for a predetermined number of times while incrementing the counter each time; repeat the at least on process step for a predetermined amount of time measured by the timer; and skip the at least one process step, restart, shutdown a subsystem, and prompt for human intervention.

18. A torque wrench apparatus configured to manipulate tubulars, the torque wrench apparatus comprising:

a) a memory store including a plurality of records, each record storing a plurality of tubular type specific parameters comprising at least one of a spin-in time value and a spin-out time value, the spin-in time value specifying an amount of time to couple tubulars, the spin-out time value specifying an amount of time to uncouple tubulars;

b) at least one sensor configured to monitor at least one process step of a tubular make-up process step or a tubular break-out process step, the at least one sensor reporting a sensor value;

c) a timer configured to measure elapsed time from the beginning of the at least one process step until the occurrence of at least one step completion confirmatory event, the timer reporting a timer value;

d) a counter configured to be incremented each time the at least one process step fails to complete within the spin-in time value or the spin-out time value, the counter reporting a counter value;

e) a comparator configured to compare values, the comparator reporting a comparator value; and f) a controller configured to:
   i) look-up at least one of the plurality of records to retrieve at least one of the spin-in time value and the spin-out time value;
   ii) cause the comparator to compare:
      the reported timer value against at least one of the spin-in time value and the spin-out time value to detect whether the at least one process step fails to complete within the spin-in time value or the spin-out time value;
   iii) detect the occurrence of the at least one step completion confirmatory event based on at least one of: the reported sensor value, the reported timer value, the reported counter value, the reported comparator value, the result of the comparison, and at least one of the spin-in time value and the spin-out time value;
   iv) raise an exception triggered by the detection of the occurrence of the at least one step completion confirmatory event; and
   v) address the exception by performing at least one of the following:
repeat the at least one process step once; repeat the at least one process step for a predetermined number of times while incrementing a counter each time; repeat the at least on process step for a predetermined amount of time measured by the timer; and skip the at least one process step, restart, shutdown a subsystem, and prompt for human intervention.

* * * * *